United States Patent
Wu et al.

(10) Patent No.: US 8,117,465 B2
(45) Date of Patent: Feb. 14, 2012

(54) MOBILE DEVICE AND POWER CONTROL METHOD THEREOF

(75) Inventors: Shang-Yen Wu, Taoyuan (TW);
Szu-Han Wu, Taoyuan (TW);
Chih-Tsung Wu, Taoyuan (TW);
Jui-Sheng Huang, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 829 days.

(21) Appl. No.: 12/187,493

(22) Filed: Aug. 7, 2008

(65) Prior Publication Data

US 2009/0061952 A1 Mar. 5, 2009

(30) Foreign Application Priority Data

Aug. 30, 2007 (TW) ................. 96132333 A

(51) Int. Cl.
*G06F 1/00* (2006.01)
*G06F 1/26* (2006.01)
*G06F 1/32* (2006.01)
*G06F 11/00* (2006.01)

(52) U.S. Cl. .......... 713/300; 713/320; 713/323; 714/15; 714/24

(58) Field of Classification Search .............. 713/300, 713/320, 323; 714/15, 24
See application file for complete search history.

(56) References Cited

U.S. PATENT DOCUMENTS

| | | | |
|---|---|---|---|
| 5,557,777 A * | 9/1996 | Culbert ...................... | 713/2 |
| 5,748,972 A | 5/1998 | Clark et al. | |
| 5,903,765 A * | 5/1999 | White et al. .................. | 713/310 |
| 5,923,099 A | 7/1999 | Bilir | |
| 6,304,981 B1 * | 10/2001 | Spears et al. ................. | 714/24 |
| 6,618,580 B2 * | 9/2003 | Parrott et al. ................. | 713/310 |
| 7,296,165 B2 * | 11/2007 | Feldstein et al. ............. | 713/300 |
| 2002/0144180 A1 | 10/2002 | Mastrianni et al. | |
| 2004/0073817 A1 | 4/2004 | Liu et al. | |

FOREIGN PATENT DOCUMENTS

| | | |
|---|---|---|
| CN | 1060729 | 4/1992 |
| TW | 493777 | 7/2002 |

OTHER PUBLICATIONS

Taiwanese language office action dated Dec. 28, 2010.
English language translation of abstract of TW 493777 (published Jul. 1, 2002).
English language translation of abstract of CN 1060729 (published Apr. 29, 1992).

* cited by examiner

*Primary Examiner* — Ji H Bae
(74) *Attorney, Agent, or Firm* — Thomas|Kayden

(57) ABSTRACT

A power control method of a mobile device includes the following steps. First, a power management module receives an externally triggered power control signal and accordingly generates an interrupt request (IRQ) at a first time point. Next, a processing unit receives the IRQ and accordingly executes a synchronization processing procedure. A file system timely stores data from a temporary cache area to a permanent storing area according to the synchronization processing procedure. Furthermore, a calculating unit calculates a first time period between a present time point and the first time point and determines whether the calculating unit reaches a maximum waiting period. When the maximum waiting period is reached, the power management module performs a power operation according to the power control signal.

17 Claims, 4 Drawing Sheets

MOBILE DEVICE AND POWER CONTROL METHOD THEREOF

This application claims the benefit of Taiwan application Serial No. 96132333, filed Aug. 30, 2007, the subject matter of which is incorporated herein by reference.

BACKGROUND OF THE INVENTION

1. Field of the Invention

The invention relates in general to a mobile device and a power control method thereof, and more particularly to a mobile device and a power control method of the mobile device when the mobile device encounters an improper power operation.

2. Description of the Related Art

A computer operation system accesses and organizes all files and all data in a computer through a file system. For example, a FAT32 file system is used in Windows 98 SE/Me, a NTFS file system is used in Windows NT/2000/XP, while a hierarchical file system (HFS) is used in Mac OS. The file system has a file allocation table (FAT) for recording storing positions and associated information of the files so that the file system can be quickly searched and the file data can be accessed.

When the computer system is operating, program files being executed reside within a temporary cache area of a memory to facilitate rapid access to data. However, the data written into the temporary cache area will not be immediately written into the permanent storing area. If the power is directly cut off, a power-off button of the computer is pressed to directly power off the computer, or a reset button of the computer is pressed to reset the system, these improper power operations disable the file system from timely writing the data into the permanent storing area, and may possibly complicate the file data blocks of the overall file system and thus cause the file data corruption or even the file system corruption.

More specifically, when the file system is updating the file allocation table, a system reset signal is triggered to cause an error in the file allocation table. Alternatively, when the file system is updating a data block of a certain file, the system reset signal is triggered to cause the error in the file content. Once the file allocation table or the file data block content has the error, the file system cannot provide the correct file content or index.

SUMMARY OF THE INVENTION

The invention is directed to a mobile device and a power control method thereof capable of effectively preventing the mobile device from generating file system corruption due to an improper power operation. Thus, a power management system is synchronized with a file system to ensure completeness and correctness of a file allocation table and a file data block content.

According to a first aspect of the present invention, a power control method of a mobile device is provided. The method includes the steps of: (a) receiving an externally triggered power control signal and accordingly generating an interrupt request (IRQ) at a first time point; (b) receiving the IRQ and accordingly executing a synchronization processing procedure; (c) timely storing data of a temporary cache area to a permanent storing area according to the synchronization processing procedure; and (d) calculating a first time period between a present time point and the first time point and determining whether the first time period reaches a maximum waiting period, wherein a power operation is performed according to the power control signal when the maximum waiting period is reached.

According to a second aspect of the present invention, a mobile device is provided. The mobile device includes a power management module, a processing unit, a memory cell, a file system and a calculating unit. The power management module receives an externally triggered power control signal and accordingly generates an interrupt request (IRQ). The processing unit receives the IRQ and accordingly executes a synchronization processing procedure. The memory cell has a temporary cache area and a permanent storing area. The temporary cache area stores data. The file system timely stores the data of the temporary cache area to the permanent storing area according to the synchronization processing procedure. The calculating unit calculates a first time period between a present time point and a first time point and determines whether the first time period reaches a maximum waiting period. The power management module performs a power operation according to the power control signal when the maximum waiting period is reached.

The invention will become apparent from the following detailed description of the preferred but non-limiting embodiments. The following description is made with reference to the accompanying drawings.

DETAILED DESCRIPTION OF THE INVENTION

Figure 1:
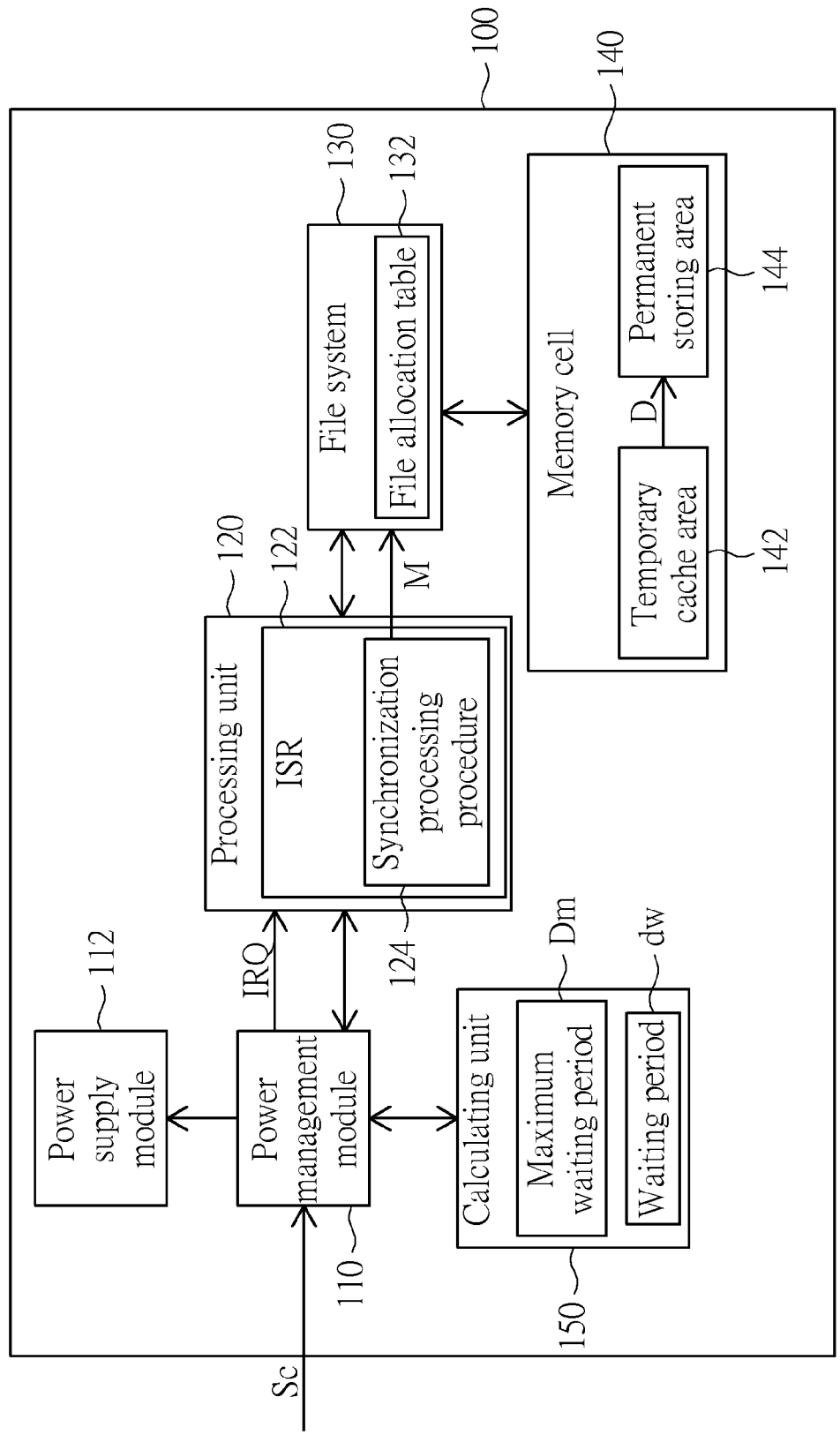
FIG. 1 is a block diagram showing a mobile device according to a preferred embodiment of the invention.

FIG. 1 is a block diagram showing a mobile device 100 according to a preferred embodiment of the invention. Referring to FIG. 1, the mobile device 100 includes a power management module 110, a processing unit 120, a file system 130, a memory cell 140 and a calculating unit 150. The power management module 110 controls a power supply module 112, which is connected to an external power (not shown), and utilizes the electric energy provided by the external power as the power for the overall mobile device. The file system 130 has a file allocation table 132. The memory cell 140 has a temporary cache area 142 and a permanent storing area 144, and the temporary cache area 142 stores data D. The file allocation table 132 records storing positions and associated information of the files in the permanent storing area 144 so that the file system 130 can be quickly searched and the file data can be accessed. The processing unit 120 has an interrupt service routine (ISR) 122, and a synchronization processing procedure is embedded in the ISR 122. The calculating unit 150 has settings associated with a maximum waiting period Dm and a waiting period dw.

Preferably, the memory cell 140 may include a dynamic random access memory (DRAM) and a nonvolatile memory. When the power is cut off, the data in the nonvolatile memory still exists. Thus, the DRAM provides the temporary cache area 142 in this embodiment, and the nonvolatile memory (e.g., the hard disk and the flash memory) provides the permanent storing area 144.

Figure 2A:
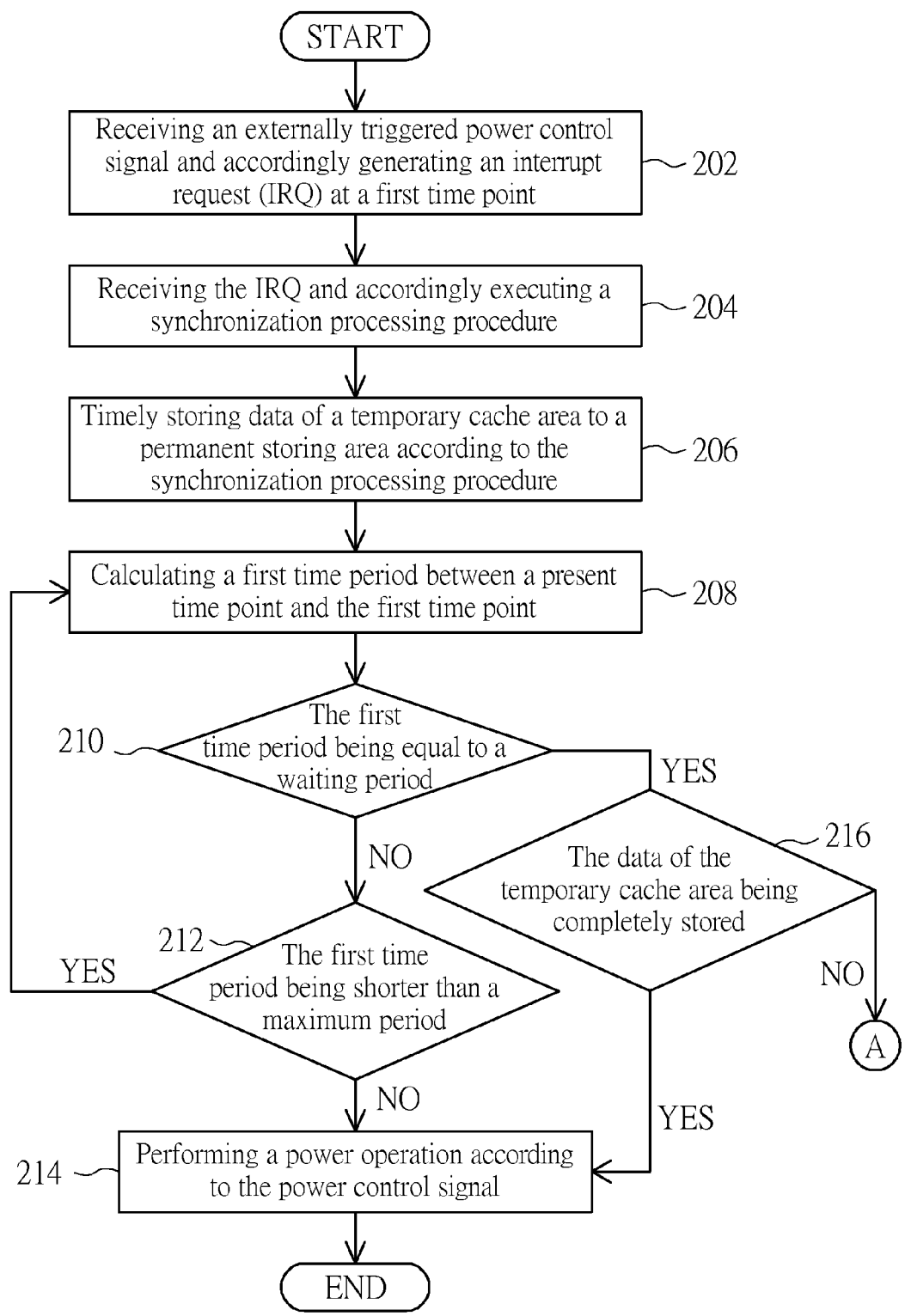
FIGS. 2A and 2B are flow charts showing a power control method of the mobile device of FIG. 1.
Figure 2B:
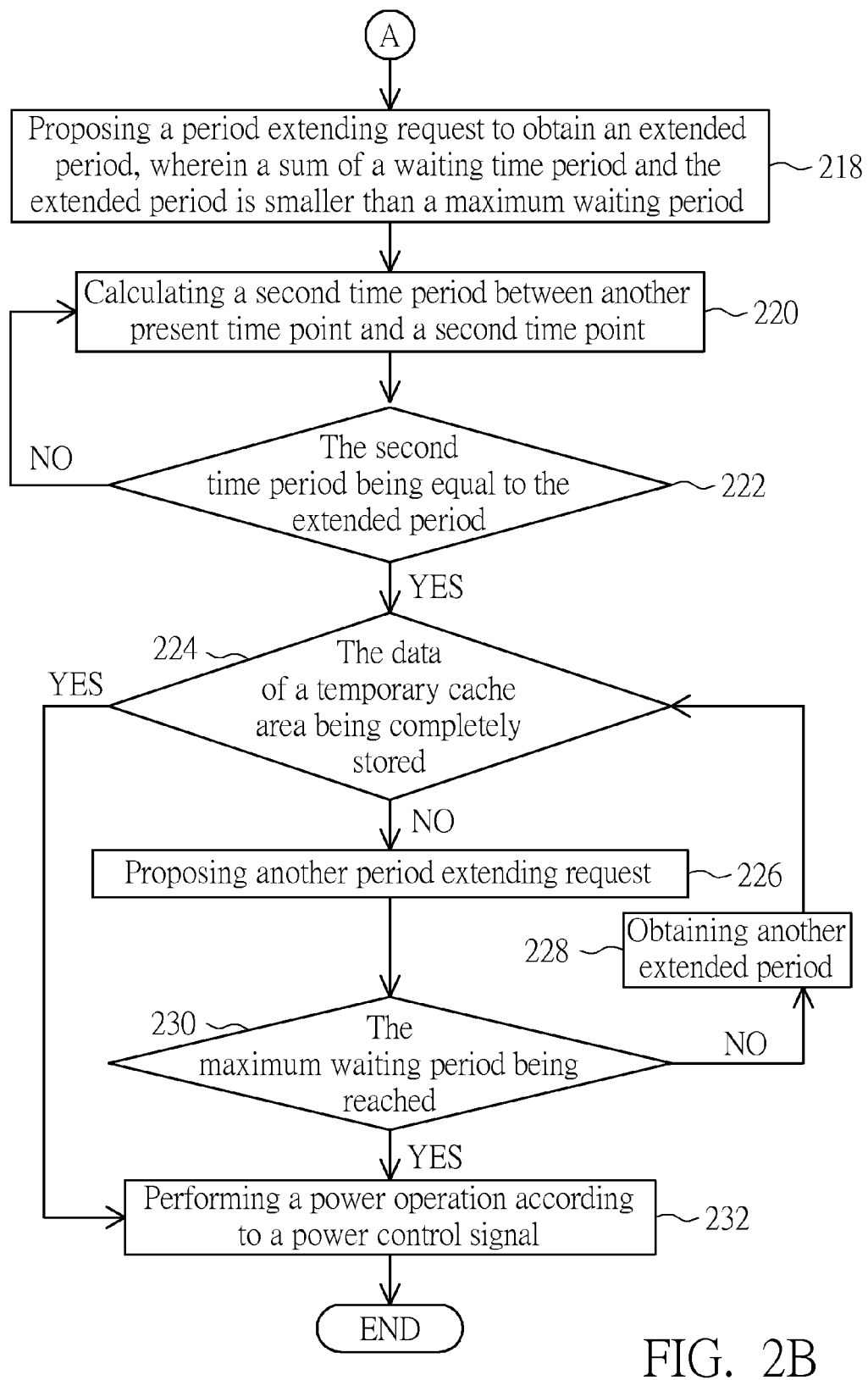

Please refer to FIGS. 1, 2A, 2B and 3A to 3D. FIGS. 2A and 2B are flow charts showing a power control method of the mobile device of FIG. 1. FIGS. 3A to 3D are schematic illustrations showing that the mobile device of FIG. 1 enters a power operation stage at different time points. First, the power management module 110 receives an externally triggered power control signal Sc in step 202, and accordingly generates an interrupt request IRQ. The externally triggered power control signal Sc is a reset signal or a power-off signal, for example. The trigger of the power control signal Sc generates the improper power operation.

Next, in step 204, the processing unit 120 receives the interrupt request IRQ, and accordingly executes a synchronization processing procedure 124. The synchronization processing procedure 124 is embedded in the ISR 122, so the processing unit 120 executes the ISR 122 according to the interrupt request IRQ in this step to enable the synchronization processing procedure 124. When the synchronization processing procedure 124 is enabled, the processing unit 120 transmits a message M to the file system 130 according to the power control signal Sc. If the power control signal Sc is the reset signal, the message M is for informing whether a system reset is to be executed. If the power control signal is the power-off signal, the message M is for informing that the power is to be cut off. At this time, as shown in step 206, the file system 130 starts to timely store the data D of the temporary cache area 142 to the permanent storing area 144 according to the synchronization processing procedure 124.

Next, in step 208, the calculating unit 150 calculates a first time period $d1(t)$ between a present time point t and a first time point t1. The calculating unit 150 starts to count the time at the first time point t1 when the interrupt request IRQ is generated, and calculates a period from the first time point t1 to a current time point according to the present time point t and determines whether the period has reached the maximum waiting period Dm in the subsequent steps.

Figure 3A:
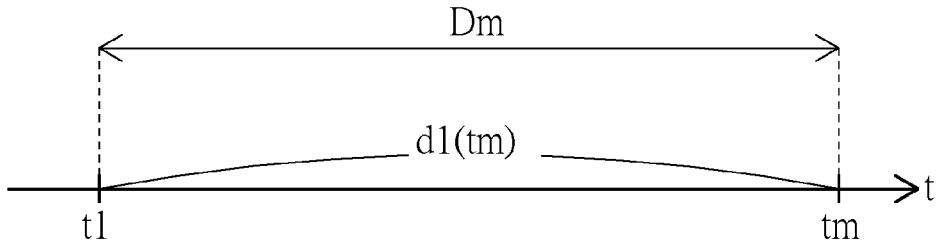
FIGS. 3A to 3D are schematic illustrations showing that the mobile device of FIG. 1 enters a power operation stage at different time points.

As shown in FIG. 3A, the mobile device enters the power operation stage at a time point tm when the first time period $d1(t)$ is just equal to the maximum waiting period Dm. That is, $d1(t)=d1(tm)=Dm$. This setting is to presume that the file system 130 can store the data D of the temporary cache area 142 to the permanent storing area 144 within the maximum waiting period Dm. Thus, the procedure directly enters step 212 after the step 208 to judge whether the first time period d(t) is shorter than the maximum waiting period Dm or not. If yes, the procedure goes back to the step 208 to again calculate a next first time period $d1(t)$ between the next present time point t and the first time point t1. If no, the procedure enters step 214, in which the power management module 110 performs a power operation according to the power control signal Sc and thus ends the control method under this design. If the power control signal Sc is the reset signal, the power management module 110 executes the system reset according to the reset signal. If the power control signal Sc is the power-off signal, the power management module 110 controls the power supply module 112 to cut off the power of the hand-held device according to the power-off signal.

Figure 3B:
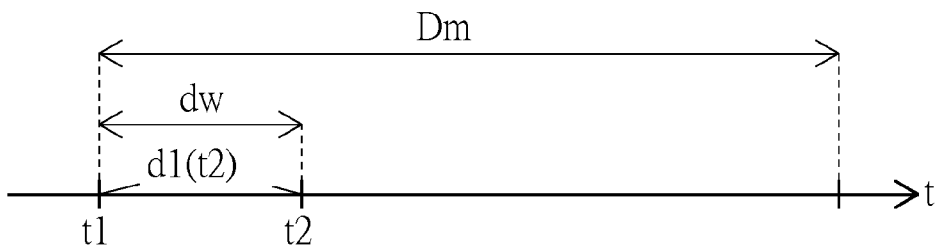

As shown in FIG. 3B, the mobile device enters the power operation stage at a second time point t2 when the first time period $d1(t)$ is just equal to the waiting period dw. That is, $d1(t)=d1(t2)=dw<Dm$. The waiting period dw is shorter than the maximum waiting period Dm. So, this design is to presume that the file system 130 may store the data D of the temporary cache area 142 into the permanent storing area 144 in the waiting period dw shorter than the maximum waiting period Dm in order to shorten the possible redundant waiting time of the system. Thus, the procedure firstly enters the step 210 after the step 208 to judge whether the first time period d(t) is equal to the waiting period dw. When the present time point t is equal to the second time point t2, the procedure enters step 216 at the second time point t2 to judge whether the data of the temporary cache area 142 is completely stored at the second time point t2 because $d(t2)=dw$. A period, $d1(t2)=t2-t1$, between the second time point t2 and the first time point t1 is equal to the waiting period dw. If the processing unit 120 has judged that the data is completely stored in the step 216, the procedure enters the step 214 to perform the power operation according to the power control signal Sc and thus to end the control method under this design. If the power control signal Sc is the reset signal, the power management module 110 executes the system reset according to the reset signal. If the power control signal Sc is the power-off signal, the power management module 110 controls the power supply module 112 to cut off the power of the hand-held device according to the power-off signal.

Figure 3C:
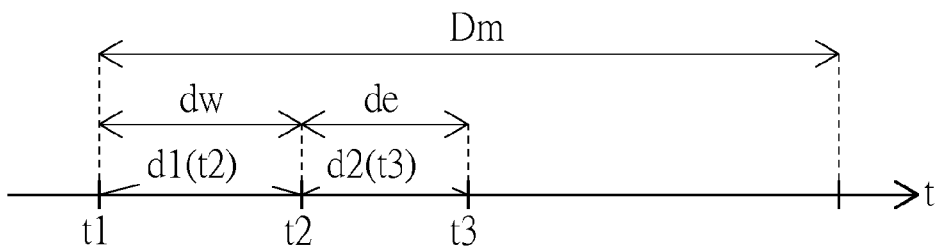

As shown in FIG. 3C, the mobile device enters the power operation stage when a second time period $d2(t')$ between another present time point t' and the second time point t2 is equal to an extended period de, that is, when another present time point t' is equal to a third time point t3 and $d1(t2)+d2(t3)=dw+de<Dm$. Because a sum of the waiting period dw and the extended period de is smaller than the maximum waiting period Dm, this design can shorten the possible redundant waiting time of the system and can ensure that the file system has the sufficient time to store the data D of the temporary cache area 142 to the permanent storing area 144. Thus, when the processing unit 120 judges that the data is not completely stored in the step 216, the procedure enters step 218. In the step 218, the processing unit 120 proposes a period extending request to the power management module 110 to obtain an extended period dw, wherein a sum of the waiting period dw and the extended period de is smaller than the maximum waiting period Dm. Next, in step 220, the calculating unit 150 further calculates the second time period $d2(t')$ between another present time point t' and the second time point. Furthermore, whether the second time period d(t') is equal to the extended period de or not is judged in step 222. If yes, the procedure enters step 224. If no, the procedure goes back to the step 220 to calculate another first time period $d1(t')$ between a next present time point t' and the second time point t2. When the second time period d(t') is equal to the extended period de, that is, when the another present time point t' is equal to the third time point t3, the procedure enters step 224 at the third time point t3 to judge whether the data of the temporary cache area 142 is completely stored at the third time point t3 because $d(t3)=de$. A period, $d2(t3)=t3-t2$, between the third time point t3 and the second time point t2 is equal to the extended period de. At this time, the processing unit 120 judges that the file system 130 has completed the storing procedure in the step 224, and the power management module 110 enters the step 232 to perform the power operation according to the power control signal Sc and thus to end the control method under this design. If the power control signal Sc is the reset signal, the power management module 110 executes the system reset according to the reset signal. If the power control signal Sc is the power-off signal, the power management module 110 controls the power supply module 112 to cut off the power of the hand-held device according to the power-off signal.

Figure 3D:
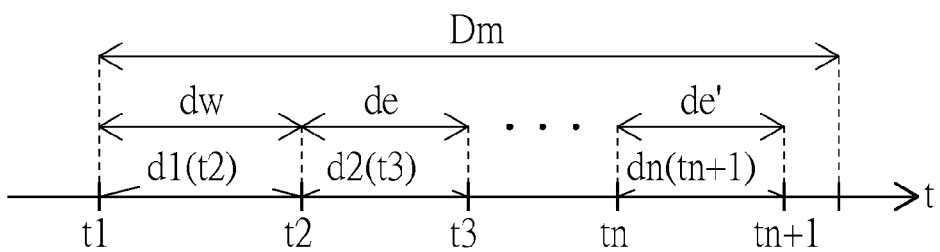

As shown in FIG. 3D, after the mobile device has proposed many period extending requests, the mobile device enters the power operation stage when an $n^{th}$ time period dn(t") between still another present time point t" and an $n^{th}$ time point tn is equal to an extended period de', that is, when the still another present time point t" is equal to an $(n+1)^{th}$ time point tn+1 and $d1(t2)+d2(t3)+ \ldots +dm(tn+1)=dw+de+ \ldots +de'<Dm$.

Because a sum of the waiting period dw and many multiple extended periods is smaller than the maximum waiting period Dm, such a design can shorten the possible redundant waiting time of the system and ensure that the file system has the sufficient time to store the data D of the temporary cache area 142 to the permanent storing area 144. Thus, when the processing unit 120 judges that the file system 130 has not completed the storing procedure in the step 224, the processing unit 120 additionally proposes a period extending request to the power management module 110 in the step 226, and judges whether a sum of the waiting period dw, the extended period de and the another extended period de' reaches the maximum waiting period Dm or not in step 230. If no, another extended period de' is obtained in step 228, and the procedure goes back to the step 224. In this design, it is possible to obtain multiple extended periods by repeatedly executing the steps 224, 226 and 228. When the sum of the waiting period dw, the extended periods and the next extended period is judged to reach or exceed the maximum waiting period Dm in the step 230, the procedure enters step 232 to perform the power operation according to the power control signal Sc and then to end the control method under this design. If the power control signal Sc is the reset signal, the power management module 110 executes the system reset according to the reset signal. If the power control signal Sc is the power-off signal, the power management module 110 controls the power supply module 112 to cut off the power of the hand-held device according to the power-off signal.

In addition, the power control method of the mobile device of the invention may also be applied to a liquid crystal display (LCD) display. The method can be implemented in a similar manner, in which the processing unit 120 accordingly executes the synchronization processing procedure 124 when receiving the interrupt request IRQ in the step 204 of this embodiment. However, when the synchronization processing procedure 124 is enabled, the processing unit 120 not only transmits the message M to the file system 130 according to the power control signal Sc but also transmits another message M' to a control unit of the LCD display. Therefore, the control unit of the LCD display can timely perform a normal switching procedure on the LCD display so as to prevent the LCD display from encountering the corruption caused by the improper power operation.

In the mobile device and the power control method thereof according to the embodiment of the invention, the synchronization processing procedure is enabled to inform the file system timely to write the data in the temporary cache area back to the file in the permanent storing area according to the system interrupt processing procedure in response to the externally triggered power control signal. Thus, the invention can synchronize the power management system with the file system, effectively prevent the mobile device from encountering the file system corruption caused by the improper power operation, and ensure the completeness and the correctness of the file allocation table and the file data block content.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power control method of a mobile device, the method comprising the steps of:
 (a) receiving an externally triggered power control signal and accordingly generating an interrupt request (IRQ) at a first time point;
 (b) receiving the IRQ and accordingly executing a synchronization processing procedure;
 (c) storing data of a temporary cache area to a permanent storing area according to the synchronization processing procedure; and
 (d) calculating a first time period between a present time point and the first time point and determining whether the first time period reaches a maximum waiting period, wherein a power operation is performed according to the power control signal when the maximum waiting period is reached, wherein the step (d) further comprises:
  (d1) judging whether the data of the temporary cache area is completely stored at a second time point when the first time period is shorter than the maximum waiting period and equal to a waiting period, wherein a period between the second time point and the first time point is equal to the waiting period.

2. The method according to claim 1, wherein the synchronization processing procedure in the step (b) comprises:
 transmitting a message according to the power control signal.

3. The method according to claim 2, wherein the power control signal is a reset signal, the message is for informing that a system reset is to be executed, and the step (d) executes the system reset according to the reset signal.

4. The method according to claim 2, wherein the power control signal is a power-off signal, the message is for informing that power is to be cut off, and the step (d) cuts off the power according to the power-off signal.

5. The method according to claim 1, wherein the step (b) further comprises:
 executing an interrupt service routine (ISR) according to the IRQ, wherein the synchronization processing procedure is embedded in the ISR.

6. The method according to claim 1, wherein the power operation is performed according to the power control signal if the data of the temporary cache area is judged to be completely stored in the step (d1).

7. The method according to claim 1, wherein, if the data of the temporary cache area is judged to be not completely stored, the step (d1) further comprises the steps of:
 proposing a period extending request to obtain an extended period, wherein a sum of the waiting period and the extended period is smaller than the maximum waiting period;
 calculating a second time period between another present time point and the second time point and determining whether the second time period reaches the extended period, wherein whether the data of the temporary cache area is completely stored at a third time point is judged when the second time period is equal to the extended period, and a period between the third time point and the second time point is equal to the extended period; and
 proposing another period extending request to obtain another extended period if the data of the temporary cache area is not completely stored, wherein a sum of the first time period, the extended period and the another extended period is smaller than the maximum waiting period.

8. A mobile device, comprising:
a power management module for receiving an externally triggered power control signal and accordingly generating an interrupt request (IRQ);
a processing unit for receiving the IRQ and accordingly executing a synchronization processing procedure;
a memory cell having a temporary cache area and a permanent storing area, wherein the temporary cache area stores data;
a file system for storing the data of the temporary cache area to the permanent storing area according to the synchronization processing procedure; and
a calculating unit for calculating a first time period between a present time point and a first time point and determining whether the first time period reaches a maximum waiting period, wherein the power management module performs a power operation according to the power control signal when the maximum waiting period is reached, wherein when the first time period is equal to a waiting period and shorter than the maximum waiting period, the processing unit further judges whether the data of the temporary cache area is completely stored at a second time point, and a period between the second time point and the first time point is equal to the waiting period.

9. The mobile device according to claim 8, wherein the processing unit transmits a message to the file system according to the power control signal when executing the synchronization processing procedure.

10. The mobile device according to claim 9, wherein the power control signal is a reset signal, the message is for informing that a system reset is to be executed, and the power management module executes the system reset according to the reset signal when the maximum waiting period is reached.

11. The mobile device according to claim 9, wherein the power control signal is a power-off signal, the message is for informing that power is to be cut off, and the power management module controls a power supply module to cut off the power according to the power-off signal when the maximum waiting period is reached.

12. The mobile device according to claim 8, wherein the processing unit further executes an interrupt service routine (ISR) according to the IRQ to enable the synchronization processing procedure, and the synchronization processing procedure is embedded in the ISR.

13. The mobile device according to claim 8, wherein if the processing unit judges that the data of the temporary cache area is completely stored, the power management module performs the power operation according to the power control signal.

14. The mobile device according to claim 8, wherein if the processing unit judges that the data of the temporary cache area is not completely stored, the processing unit further proposes a period extending request to the power management module to obtain an extended period, wherein a sum of the waiting period and the extended period is smaller than the maximum waiting period.

15. The mobile device according to claim 14, wherein:
the calculating unit further calculates a second time period between another present time point and the second time point and determines whether the second time period reaches the extended period after obtaining the extended period;
the processing unit further judges whether the data of the temporary cache area is completely stored at a third time point if the second time period is equal to the extended period; and
if the data of the temporary cache area is judged to be not completely stored, the processing unit further proposes another period extending request to the power management module to obtain another extended period, wherein a sum of the first time period, the extended period and the another extended period is smaller than the maximum waiting period, and
a period between the third time point and the second time point is equal to the extended period.

16. The mobile device according to claim 8, wherein the memory cell comprises a dynamic random access memory (DRAM) for providing the temporary cache area.

17. The mobile device according to claim 8, wherein the memory cell comprises a nonvolatile memory for providing the permanent storing area.

* * * * *